United States Patent [19]

Nunley

[11] Patent Number: 4,638,159
[45] Date of Patent: Jan. 20, 1987

[54] GRADED SHAPED SPATIAL RESOLUTION NUCLEAR DETECTORS

[75] Inventor: Allen Nunley, Houston, Tex.

[73] Assignee: Halliburton Company, Duncan, Okla.

[21] Appl. No.: 716,887

[22] Filed: Mar. 27, 1985

[51] Int. Cl.$^4$ ............................ G01V 5/08; G01T 1/20
[52] U.S. Cl. ...................................... 250/267; 250/256; 250/269; 250/361 R; 250/363 R; 250/366
[58] Field of Search ............... 250/256, 267, 269, 270, 250/361 R, 367, 366, 363 R, 374

[56] References Cited

U.S. PATENT DOCUMENTS

| | | | |
|---|---|---|---|
| 2,711,482 | 6/1955 | Goodman | 250/260 |
| 2,917,647 | 12/1959 | Fowler et al. | 313/93 |
| 3,225,193 | 12/1965 | Hilton et al. | 250/367 |
| 4,122,339 | 10/1978 | Smith, Jr. et al. | 250/264 |

Primary Examiner—Janice A. Howell
Assistant Examiner—Constantine Hannaher
Attorney, Agent, or Firm—William J. Beard

[57] ABSTRACT

For use in a sonde adapted to be lowered in a well bore, the present apparatus sets forth an improved nuclear event detector. The detector is sized and shaped monotonically increasing in cross section or diameter with increasing distance from the radiation source to thereby bias the detector; this bias counteracts the bias arising from geometry altering the pattern in which nuclear events impinge on the detector, thereby altering the distribution of such events.

12 Claims, 7 Drawing Figures

FIG. 1
(PRIOR ART)
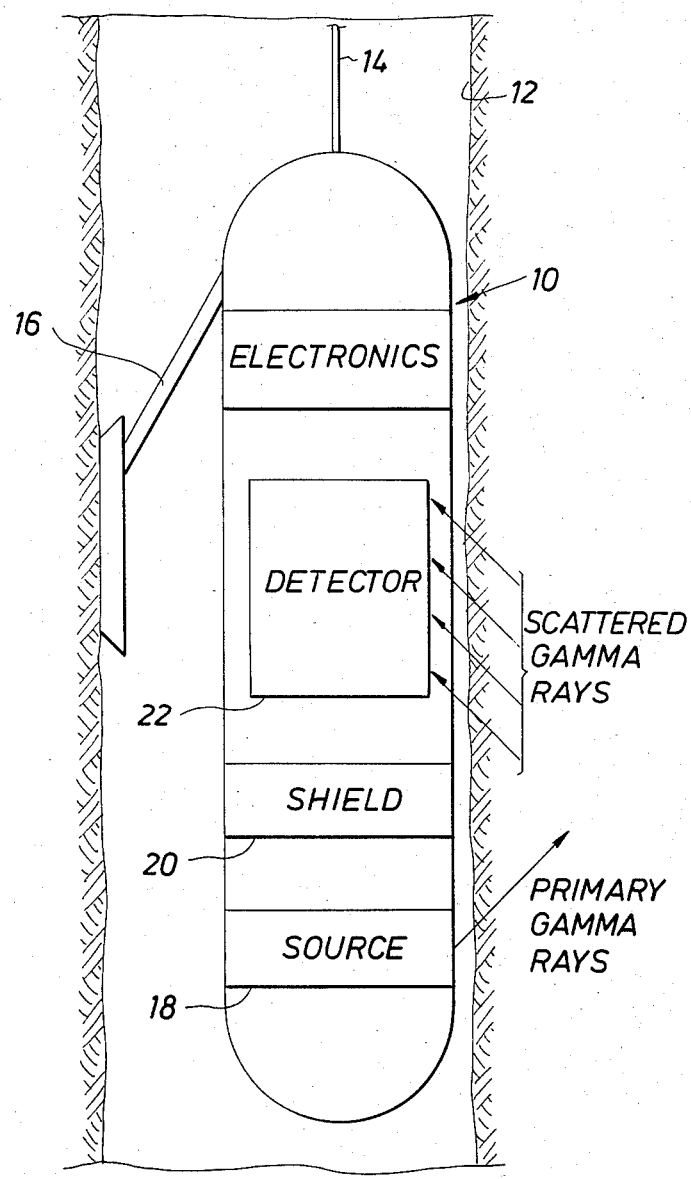
FIG. 2
(PRIOR ART)
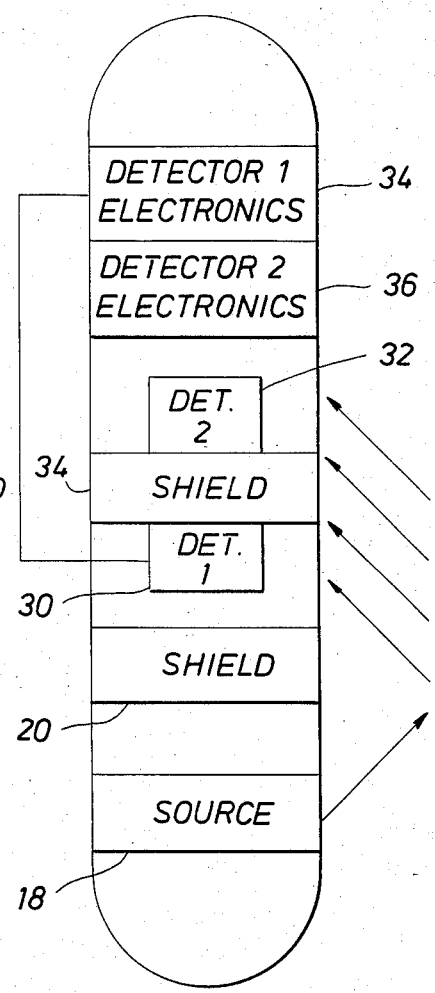
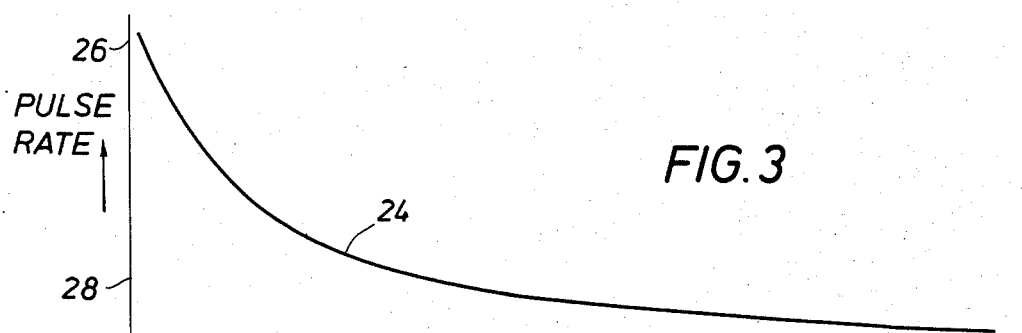
FIG. 3
NUCLEAR EVENT DISTRIBUTION ALONG DETECTOR(S)
TO FAR END →

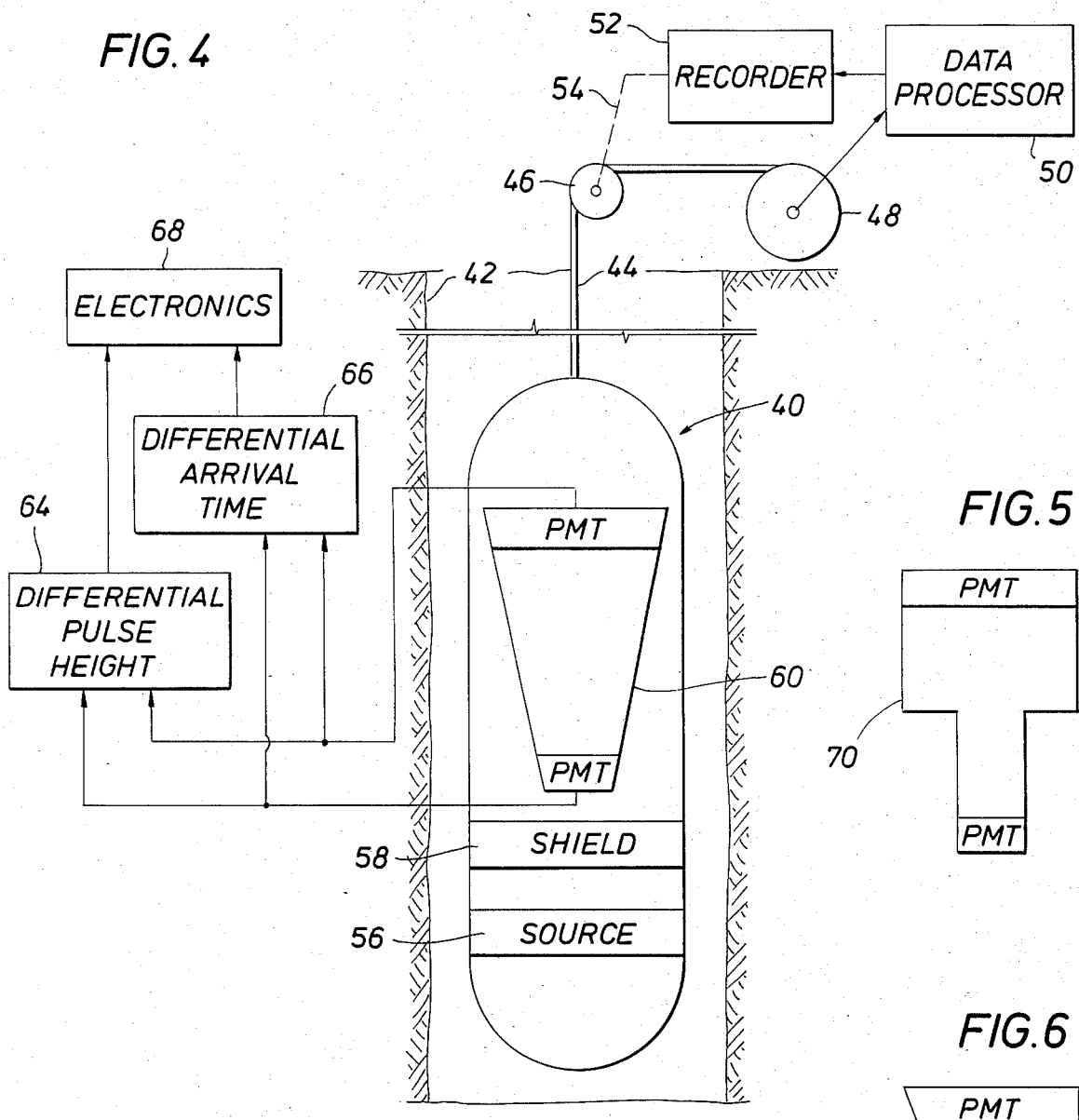

GRADED SHAPED SPATIAL RESOLUTION NUCLEAR DETECTORS

BACKGROUND OF THE DISCLOSURE

This disclosure is directed to a nuclear event detector placed in a sonde adapted to be lowered in a well borehole to conduct well logging operations. Consider as an example a sonde which carries a pulsed neutron source in the sonde. The source is used to irradiate the adjacent formations. The neutron impingement on the formations creates observable nuclear events impinging on one or more detectors carried in the sonde. Typically, the detectors in the sonde are shielded from direct exposure to the source. Thus, in a typical example, there is shielding in the sonde located so that the detectors are exposed to detect only nuclear events originating from the formation adjacent to the well borehole. As can be understood, the example can be extended to logging systems other than pulsed neutron systems.

Consider the pulsed neutron system as an example. The source is suspended in the well at the specific location for the purpose of irradiating the adjacent formations. The formation response sensed by the detectors has the form of spatially distributed nuclear events. The response is in part a function of the geometry of the system. Normally, the nuclear events are more thinly distributed at a greater physical distance from the source. The distribution of impinging photons or particles on the detectors is thus typically a monotonic function decreasing with distance. This is true whether a single detector is used or multiple detectors are deployed along the sonde.

Within a given geometric arrangement having a particular source and one or more detectors having a spatial relationship to the source and the adjacent formations, the nuclear events observed by the detector (one or more) vary widely. At one end of the detector, the nuclear events may occur excessively rapidly. In this case, they may occur at a rate so high that they cannot be counted. One solution for this is to reduce the detector diameter or cross section at the near end of the detector or at a detector nearest to the source. That is, with the smaller detector diameter, the number of nuclear events sensed by the diameter is reduced to a scale factor enabling the connected counting circuit to count without nuclear event pile-up.

Consider the situation in a multiple detector arrangement or a single detector which has a remote end portion. The count rate at the remote end or remote detector is typically much lower. If the count rate is too low, the number of nuclear events is so small as to create a poor statistical base for the nuclear events. This problem can be overcome by increasing the diametric size of the detector so that the number of events is increased.

As will be observed, the geometrically created distribution of nuclear events impacting the detector poses two solutions which are contradictory to one another. If the detector is made larger, the count rate may become quite excessive at the near end, exceeding the count rate capacity of the connected electronic counting circuitry. The converse problem is also noted for the far end of the detector. This apparatus proposes a nuclear detector having an irregular shape. A conic shape detector and a step detector are both described as detectors having a monotonically increasing diameter as a function of distance from the source to overcome both problems. That is, such a detector collaborates with the source and particularly the geometric bias arising from component placement to overcome difficulties with spatial distribution.

This is particularly advantageous in reducing complexity of tools. Consider as an example a tool for measuring porosity utilizing a graded spatial resolution thermal neutron detector in accordance with the teachings of this disclosure. Such a detector can replace multiple deployed detectors separated by shielding in the sonde. Assume that is placed in a two detector system. A typical two detector borehole compensated logging tool utilizes an algebraic relationship between the count rates of the two detectors to determine the value of interest, porosity in this example. Thus, two detectors are required; also, there are two required, separate mountings for the two detectors. In addition, the detectors are connected with first and second detector channels. Each detector channel includes appropriate transducers connected to the detectors, preamplifiers, various high voltage supplies, counter circuits and the like. The mechanical structure supporting all this also includes separate mountings for the detectors, a shield between them, housing and shock mounting apparatus for the equipment.

With this disclosure, the duplicate system can be markedly reduced. For instance, a single detector crystal having a shape in accordance with the teachings of this disclosure could be used. Such a detector having two ends can be connected to a differential circuit. For instance, differential arrival time can be sensed by connecting a differential input circuit to both ends of the detector. An alternate arrangement is to utilize differential pulse height sensing apparatus, again connected to both ends of the detector. This arrangement thereby reduces the associated electronics required.

The present apparatus is therefore summarized as a spatially shaped nuclear detector for a sonde which has a bias overcoming the geometric bias in nuclear event distribution. Through the use of this apparatus, the nuclear events observed by the detector at the near end and far end can be brought to approximate parity. This avoids difficulties arising from excessive nuclear events occuring at the near end, thereby exceeding the capacity rate of the detector and associated counting circuitry; it also avoids the problem of low distribution of events at the far end where the nuclear events may be so reduced in quantity that a poor statistical basis is obtained. In both instances, the problem is overcome by constructing the nuclear detector with a monotonically diametrically increasing construction with increasing distance from the source.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is a prior art arrangement of source and detector in a sonde in a well bore;

FIG. 2 is another prior art arrangement of a source and two detectors having two electronic system in a sonde and adapted to be lowered into a well bore;

FIG. 3 is a graph of nuclear event distribution versus pulse distribution along the detector to the far end as would occur in each of the prior art detectors of FIGS. 1 and 2;

FIG. 4 shows the detector of the present disclosure which increases in diameter monotonically increasing with distance from the source thereby modifying spatial distribution of nuclear events, all as shown in a sonde supported in a well bore;

FIG. 5 is an isolated view of a modified detector having a step function;

FIG. 6 is another alternate construction of detector having changing diameter as a function of distance from the source; and FIG. 7 shows the nuclear event versus pulse distribution along detectors of the present invention.

DETAILED DESCRIPTION OF THE PREFERRED EMBODIMENT

The present apparatus is best understood with a review of systems shown in the prior art. FIG. 1 discloses a sonde 10 suspended in a well bore 12 on a logging cable 14. The sonde is forced to the side and pushed against the annulus of the well borehole by means 16 which decentralize the sonde. The sonde encloses a suitable radiation source 18. This source can be a pulsed source of neutrons as an example. The source 18 is typically located at one extremity of the tool. It is isolated by a shield 20 to prevent radiation from directly impinging on the detector 22 in the sonde. The detector 22 has a finite shape defined by a specific diameter and length. Moreover, this detector is cylinder having a long axis arranged along the length of the sonde. To this end, one portion of the detector may be described as the near end, and one end of the detector is the far end. The terms "near" end and "far" end result from the geometric position of the detector relative to the source and the adjacent formations.

In the use of the prior art tool shown in FIG. 1, the near end of the detector received more nuclear events then the far end. The term "nuclear event" as used in this disclosure refers to both particles and radiation which impinge on the detector and are detected by its operation.

There is a positional bias in nuclear events at the detector 22. The curve 24 shown in FIG. 3 sets out a typical bias. The shape of the curve is in part dependent on the geometry of the source, detectors and surrounding formations. While the shape of the curve may vary somewhat, the relationship causing the curve shape may vary, it is nevertheless inevitable that there is a bias so that the far end of the detector has lower nuclear event distribution. Accordingly, the near end of the detector may receive nuclear events at a rate greater than can be counted. A typical upper limitation level is established at 26 in the graph of FIG. 3. Another limitation is established at 28. If the nuclear event distribution exceeds the level 26, it may be so great that events cannot be counted while if it falls below the rate at 28, it may be so low that it will be statistically unreliable.

Attention is next directed to FIG. 2 of the drawings. In FIG. 2, a multiple detector system of prior art is also illustrated. Again, it may have a source 18 isolated by a shield 20. In this embodiment, there is a first detector 30 and a second detector 32, and the two detectors are isolated by a shield 34. The detector 30 is connected to a first set of electronics as indicated at 34. There is a second set of detector electronics at 36. In this particular arrangement, the two detectors will typically provide different output count rates. This is again a result of the geometric bias which arises from the physical position of the two detectors relative to the source. The source irradiates the adjacent formations; and two detectors observe the impinging nuclear events and form signals for the duplicate electronic equipment at 34 and 36. In the same fashion as observed with respect to FIG. 1, the two detectors 30 and 32 are exposed to events occurring with different distribution. Thus, FIG. 3 again applies to the two detectors illustrated in FIG. 2. That is, the pulse rate distribution shown in FIG. 3 sets forth a bias wherein the far end of the detector array is exposed to events occurring at a reduced rate, and the near end of the detector array may well be receiving nuclear events at an excessive rate. The limits exemplified at 26 and 28 in the nuclear event distribution may be exceeded. An important factor to note is that duplicate electronics are included for the two detectors which increases the cost and complexity of the logging apparatus shown in FIG. 2.

Attention is next directed to FIG. 4 which shows the improved and unobvious structure of this disclosure. In FIG. 4, a sonde 40 is lowered into a well bore 42 suspended on an armored logging cable 44. The cable is spooled over a sheave 46 and is stored on a supply drum or reel 48. The data from the sonde 40 is input to a data processor 50. The data processor places the data in suitable form and outputs the data to a recorder 52. An electronic or mechanical depth measuring system 54 provides measurements of sonde depth in the borehole 42 which data is input to the recorder so that the log that is recorded is a function of depth in the borehole.

The sonde 40 encloses a source 56. The source is isolated by a shield 58. The source 56 can be any typical source including a source of photon energy or particles such as neutrons.

The improved apparatus of this disclosure incorporates a nuclear detector 60. As shown in FIG. 4, the detector 60 has monotonically increasing diameter at the far end. That is, it has a small diameter at the near end and a large diameter at the far end. This increase in diameter enables the detector to observe inbound nuclear events as a function of detector cross-sectional bias along the length. This diametric bias overcomes the geometric bias in nuclear event distribution which would otherwise occur as exemplified in the prior art arrangement of detectors shown in FIGS. 1 and 2. Moreover, the detector 60 can thus level the nuclear event distribution as a function of length along the detector system. Specifically, FIG. 7 includes a curve 62 which is nuclear event distribution as a function of length along the detector from the near end to the far end. The detector 60 thus is biased along the length so that the pulse rate is substantially level as shown in the curve at 62.

By way of background, typical constructions of detector 60 are believed to be well known in the art, one typical construction being a sodium iodide crystal having thallium doping. Such a crystal is positioned adjacent to a photomultiplier tube which observes scintillations from the crystal. An alternate source is a gas filled tube, typically having an inert gas such as xenon, krypton or radon gas in it with anode leads at both ends. In either case, observable nuclear events are converted into signals by a photomultiplier tube (PMT) at one end of the detector. In the detector 60, first and second photomultiplier tubes are located adjacent the detector crystal, one at each end. That is, there is a photomultiplier tube (PMT) at the near end and a separate PMT at the far end. The two photomultiplier tubes thus form output signals which encode a differential. The two signals are output to a differential pulse height detector 64. Alternatively, the difference in time of arrival can be observed by means of a differential arrival time circuit 66. Both PMT output signals are input to the detectors 64 and 66. The two differential signals, or either of them, are then provided to suitable electronic circuitry 68 for signal conditioning, multiplexing and conversion into digital format for transfer to the data processor 50 shown in FIG. 4. In this particular arrangement, the one detector crystal is observed by two separate PMTs to thereby enable determination of differential pulse heights or differential arrival time. If desired, only one PMT output signal can be used.

Attention is next directed to FIG. 5 of the drawings, which shows a detector cross section 70. The cross section 70 in FIG. 5 incorporates a step function in cross section. The step function is scaled by one or more steps having specific diameters to approximately normalize the pulse rate distribution in the respective lengthwise portions. Through the use of this kind of arrangement, nuclear event distribution along the length of the detector is given by the curve 72 in FIG. 7.

The numeral 80 identifies another geometric construction which biases the detector diameter to overcome the nuclear event distribution problem. This is a third alternate shape for the detector cross section. In this instance, the detector diameter again implements a bias in observed nuclear events to counteract the spatial distribution arising from the geometric arrangement of the source and detectors relative to the formation undergoing testing.

As will be understood from the present disclosure, nuclear event distribution through the enclosed space within the detector is biased to overcome the geometric spatial distribution which would otherwise occur. If, for instance, the conventional detector shape were a right cylinder or rectangular, the pulse distribution given in FIG. 3 would occur. With this biased arrangement of detector diameter or cross section, the detected nuclear events as a function of distance between far end and near end is then placed safely within the desired pulse rate limits 26 and 28 shown in FIG. 3. The limits 26 and 28 imposed on the nuclear event distribution graph shown in FIG. 7 uses the monotonically diametrically increasing detector of the present disclosure to overcome the irregularity in nuclear event distribution.

The foregoing is directed to the preferred embodiment, the scope is determined by the claims which follow.

What is claimed is:

1. For use in a sonde adapted to be lowered into a well borehole to conduct well logging operations by the observation of nuclear events impinging on the apparatus, a nuclear event scintillation detector having a specified size and shape between two spaced ends, one end being a near end and the other end being a far end, the cross section increasing monotonically along the detector from the near end to the far end to define a bias along the length thereof wherein the bias opposes a bias in spatial distribution of nuclear events measured by such a detector wherein the increase modifies nuclear event distribution in the detector within upper and lower scintillation count limits, and wherein said scintillation detector is constructed and arranged to receive nuclear events from any direction to create scintillations therein.

2. The scintillation detector of claim 1 wherein said increase is achieved in a structure having diverging walls.

3. The scintillation detector of claim 1 wherein said increase is achieved in a structure having walls having a step function increase.

4. The apparatus of claim 1 wherein said detector encloses a specified size and shape between said near end and said far end and wherein photomultiplier tubes are located at said near end and far end and said photomultiplier tubes provide first and second output signals which output signals are connected to differential analytical circuit means.

5. The scintillation detector of claim 1 wherein specified minimum and maximum nuclear event scintillation rates are established, and the cross section of said detector is biased along the length of said detector so that pulses arising from nuclear events are within the established rates.

6. The sonde of claim 1 wherein said detector is deployed along the sonde to overcome a spatial distribution along the length thereof arising from the geometric placement of a source on the sonde relative to said detector.

7. The apparatus of claim 6 including shield means in the sonde between said detector and said source.

8. The apparatus of claim 6 including shield means preventing direct irradiation of said detector by said source.

9. The apparatus of claim 1 wherein said detector has an internal space defined between two diverging walls.

10. The apparatus of claim 1 including a pressure housing enclosing said nuclear event scintillation detector.

11. The apparatus of claim 10 including means measuring the depth of said nuclear event detector in a well borehole.

12. The apparatus of claim 10 including a logging cable supporting said pressure housing.

* * * * *